United States Patent [19]

Ukawa

[11] Patent Number: 5,201,129
[45] Date of Patent: Apr. 13, 1993

[54] VERTICAL INDICATOR UNIT

[75] Inventor: Fukujiro Ukawa, Machida, Japan

[73] Assignee: Kabushiki Kaisha Kito Koei, Tokyo, Japan

[21] Appl. No.: 777,237

[22] PCT Filed: Feb. 25, 1991

[86] PCT No.: PCT/JP91/00240

§ 371 Date: Nov. 12, 1991

§ 102(e) Date: Nov. 12, 1991

[87] PCT Pub. No.: WO91/13320

PCT Pub. Date: Sep. 5, 1991

[30] Foreign Application Priority Data

Feb. 27, 1990 [JP] Japan .................. 2-44395

[51] Int. Cl.$^5$ .............. G01C 9/14; G01C 9/18
[52] U.S. Cl. ........................ 33/391; 33/392; 33/396; 33/402
[58] Field of Search .......... 33/391, 365, 392, 396, 33/397, 398, 402, DIG. 1

[56] References Cited

U.S. PATENT DOCUMENTS

| | | | |
|---|---|---|---|
| 3,097,565 | 7/1963 | Kupelian | 33/397 |
| 3,372,386 | 3/1968 | Klinger | 33/391 |
| 3,660,840 | 5/1972 | Plofchan | 33/366 |
| 3,975,831 | 8/1976 | Jysky et al. | 33/397 |
| 4,302,962 | 12/1981 | Williams | 33/391 |
| 4,517,749 | 5/1985 | Scotto | 33/391 |

FOREIGN PATENT DOCUMENTS

| | | |
|---|---|---|
| 36-4470 | 3/1961 | Japan . |
| 55-47635 | 3/1980 | Japan . |
| 57-101912 | 6/1982 | Japan . |
| 60-131420 | 7/1985 | Japan . |
| 60-123616 | 8/1985 | Japan . |
| 61-102814 | 6/1986 | Japan . |
| 61-274639 | 12/1986 | Japan . |
| 1030650 | 7/1983 | U.S.S.R. ............... 33/392 |
| 1281890 | 1/1987 | U.S.S.R. ............... 33/365 |
| 204316 | 9/1924 | United Kingdom ....... 33/396 |

Primary Examiner—William A. Cuchlinski, Jr.
Assistant Examiner—C. W. Fulton
Attorney, Agent, or Firm—Cushman, Darby & Cushman

[57] ABSTRACT

The invention relates to a vertical indicator unit for measurement comprising placing a float in a vessel filled with a liquid, supporting the vessel with an external supporting frame, securing a doughnut-like magnet integrally with the outside of the lower end portion of the float, connecting a vertical supporting rod to a hinge contact point at the lower end of the external supporting frame, securing a separate funnel-like doughnut magnet to the upper end head portion of the vertical supporting rod, reversely polarizing both the magnets for diamagnetically repulsively maintaining both the magnets from each other at a certain air space, inserting the head portion of the vertical supporting rod into the inner space of the upper vessel, and vertically maintaining the vertical supporting rod with respect to a predetermined position of the lower portion of the supporting frame by diamagnetism of the doughnut-like magnet of the float and the funnel-like magnet provided in the head portion of the vertical supporting rod separated by the head portion and the space.

1 Claim, 3 Drawing Sheets

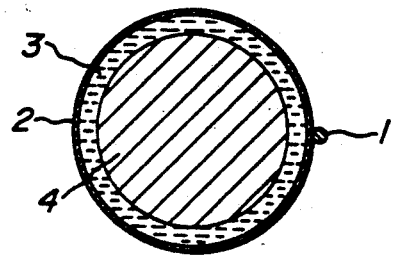
FIG_1
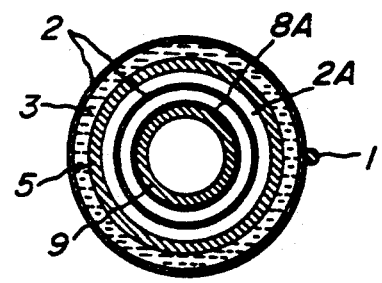
FIG_2
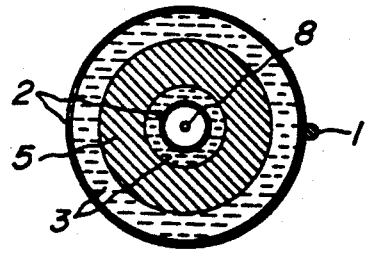
FIG_3

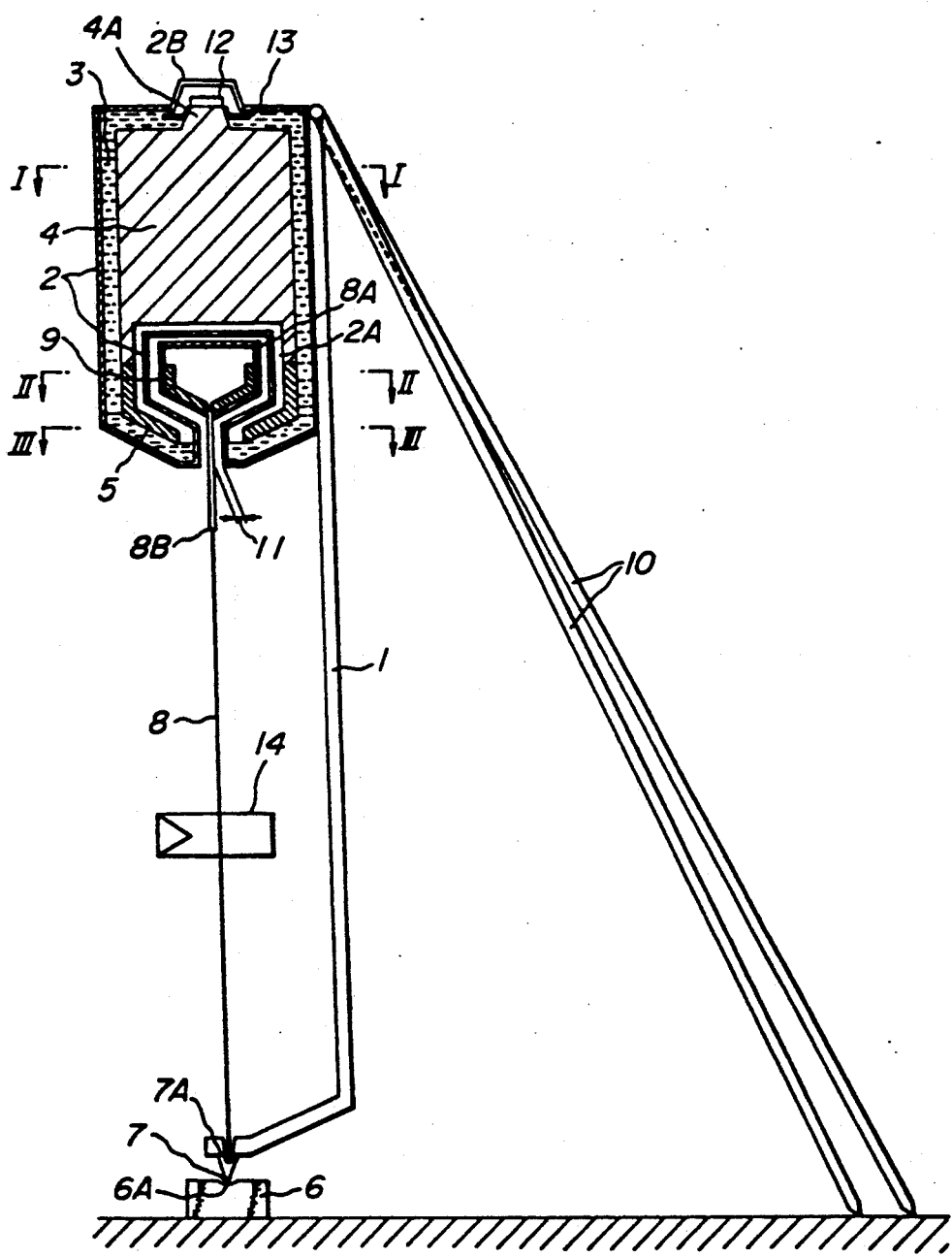
FIG_4

PRIOR ART
FIG. 5
PRIOR ART
FIG. 6
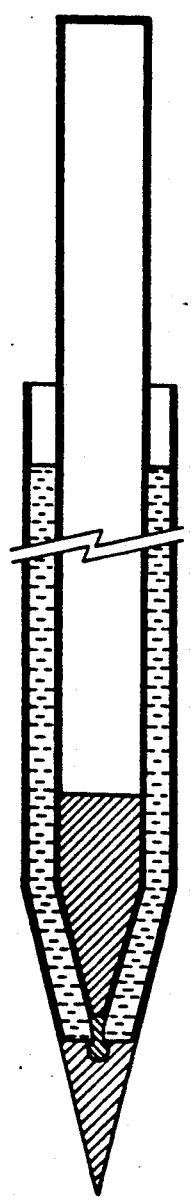
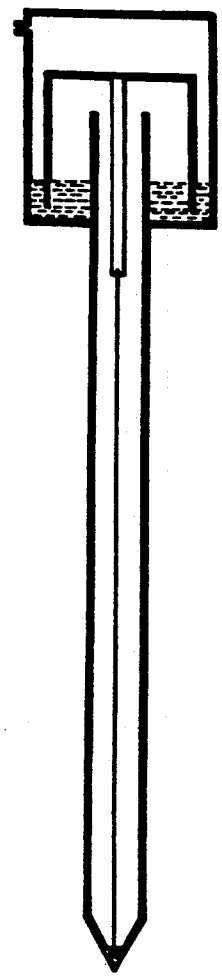

VERTICAL INDICATOR UNIT

TECHNICAL FIELD

The present invention relates to a vertical indicator unit comprising a vessel containing a liquid and a float therein, an external supporting frame for supporting the vessel, a doughtnut-like magnet integrally secured to the float on the outside at the lower end of the float, a vertical supporting rod connected to a hinge contact point at the lower end of the external supporting frame, a separate funnel-like doughnut magnet secured to the upper head portion of the vertical supporting rod, characterized in that both the magnets are reversely polarized and diamagnetically repulsively held from each other at a certain air space, the head portion of the vertical supporting rod is inserted into the internal space of the vessel, and the vertical supporting rod is vertically held with respect to a specified position at the lower portion of the supporting frame, wherein the head portion of the vertical supporting rod is separated from the vessel by diamagnetism between the doughtnut-like magnet secured to the float and the funnel-like magnet provided in the head portion of the vertical supporting rod.

BACKGROUND ART

As a prior vertical indicator unit, it has been known "a measuring pole comprising an exterior pipe, an interior pipe pole connected to the inner lower portion of the exterior pipe by freely rotatable ball joint coupling, and a liquid filled in an allowance portion between the exterior pipe and the interior pipe pole, so as to secure completely verticality of the interior pipe pole" (Japanese Patent Application Laid Open No. 60-131,420) (See FIG. 5.)

This measuring pole fills a liquid between the exterior pipe and the interior pipe pole, but does not hermetically seal the open end thereof, so that there is such a disadvantage that the pole cannot be laid horizontally for housing.

As shown in Japanese Patent Application Laid Open No. 61-274,639, it has also been known "a vertical indicating float comprising a vessel containing a liquid therein, and a base-open type float vessel connected to the lower end of pole portion of the liquid-containing vessel by vertical supporting rod with allowance for the inner wall of said pole portion, thereby lowering an atmospheric pressure of an upper chamber of the vessel and raising an atmospheric pressure of an inner chamber of the said float vessel, so as to produce buoyance in an imaginary space including apparatuses in the float vessel" (ref. FIG. 6).

In this float, a liquid is filled in an upper vessel of a supporting frame, a bottom-open type float vessel inserted into said upper vessel is floated on the liquid of upper vessel of the supporting frame, the bottom-open type float vessel is connected to an inner lower end portion of the supporting frame by a vertical supporting rod and connecting rod or cord, the liquid is filled up to the imaginary water surface, the supporting frame is hermetically sealed by sealing plug means, and a gas is filled in an upper chamber of the supporting frame with pressure from the sealing plug means, thereby generating a differential level on the water surface in the float vessel and the water surface in the vessel of the frame, and standing the supporting frame for attracting the float within allowance, so as to obtain a vertical indicating line in the connecting rod or cord connected between float and the lower end of supporting frame.

This float type vertical indicating pole unit has a shortcoming that it takes much time for obtaining a vertical indicating line, and if a supporting frame is laid horizontally, an open upper end of the pole portion of supporting frame warps or make errors in a vertical supporting mechanism by the movement of liquid from the upper vessel to float vessel or the pole portion of the supporting frame, thereby liquid filling and gas filling with pressure should be started again.

The prior vertical measuring pole by means of a float was inconvenient by housing an indicating portion within a vertical indicating pole portion of the frame vessel for hermetically sealing a liquid.

DISCLOSURE OF THE INVENTION

An object of the invention is to obviate the aforementioned shortcoming of a vertical indicator or a vertical indicating pole means of float type in the prior art. The present invention is to provide a vertical indicating unit for survey comprising a reverse cup-like vessel having a space within an inner wall of the vessel wherein a liquid is filled, a float on the liquid filled inside of the vessel and having a doughnut-like magnet attached for surrounding an inner lower space of said vessel, an inner head portion of a vertical indicating rod having a funnel-like doughnut magnet provided in opposition to the doughnut-like magnet of said vessel and inserted in the inner space of said vessel, a vertical indicating rod secured to the lower portion of the upper head portion of the vertical indicating rod, and an exterior supporting frame secured to the outside of said vessel, characterized in that the vertical supporting rod is connected to a hinge contact point of the lower end of the exterior supporting frame, the funnel-like doughnut magnet provided at the upper end of the head portion of said vertical indicating rod and the funnel-like doughnut magnet provided in the lower extension of said float are reversely polarized and diamagnetically repulsively held from each other at a certain air space, and the vertical indicating rod is vertically held with respect to a predetermined position of the lower base portion of the exterior supporting frame by diamagnetism of both the magnets and buoyancy of the float.

The present invention is an improvement for eliminating maintenance and management expenses of liquid by keeping a certain space between the float portion and the vertical indicating rod head portion by repulsion of the magnets so as to keep verticality, and by floating the float portion by separately sealing in the vessel.

BRIEF DESCRIPTION OF THE DRAWINGS

FIGS. 1, 2 and 3 are horizontal cross-sectional views of a vertical indicator unit according to the invention; and FIG. 4 is a side view of the vertical indicator unit according to present invention.

FIG. 5 and FIG. 6 illustrate sectional views of the prior art Throughout different views of the drawings,

| 1 | supporting frame | 2 | vessel |
|---|---|---|---|
| 3 | liquid | 4 | float |
| 5 | doughnut-like magnet integrally provided with a lower portion of the float | | |
| 6 | fixed point | 7 | setting end |
| 7A | hinge portion | 8 | vertical indicating rod |
| 8A | head portion | | |

-continued

| | |
|---|---|
| 9 | funnel-like magnet integrally provided with the head portion of the vertical indicating rod |
| 10 | tripod |
| 11 | allowance width between the vertical indicating rod head portion and the vessel opening portion |
| 12 | waterproof receiving antenna base |
| 13 | ground electric wave buffer plate |
| 14 | corner prism reflecting mirror |

BEST MODE FOR CARRYING OUT THE INVENTION

The present invention relates to a vertical indicator unit by holding a float within a vessel with a liquid and magnets, reversely polarizing a magnet of a vertical indicating rod head portion held in the space within the vessel and a magnet of the float, floating the head portion of the vertical indicating rod in the space within the vessel by diamagnetism of both magnets, and indicating said rod verticality.

The invention will be explained referring to the accompanying drawings.

A vessel 2 is fixed at the upper portion of a supporting frame 1, a liquid 3 is filled in the vessel 2, in the inside of the vessel is hermetically sealed a float 4 integrally secured with a doughtnut-like magnet 5 at the lower portion thereof, a vertical indicating rod 8 contacting and vertically standing at a setting portion 7 and a hinge contact point 7A is provided at a wedge-like position 6A of a fixed point 6, a funnel-like magnet 9 is mounted on an upper end head portion 8A of the vertical indicating rod 8, the doughnut-like magnet 5 of the float portion 4 and the magnet 9 provided in the head portion 8A of the vertical indicating rod 8 are faced each other with a certain air space 2A reversely polarized, the head portion 8A of the vertical indicating rod 8 is floated in a space 2A within the vessel 2, a tripod 10 is secured to the upper portion of said supporting frame 1, and a relative position is determined within an allowance width 11 by the tripod 10 and said supporting frame 1. Thus the whole mechanism including a supporting frame 1 and a vertical indicating rod is set.

In the above vertical indicator unit, the float 4 is separated from the vessel 2 by a predetermined distance by a liquid, the buoyancy of the float 4 is indirectly transmitted by repulsion of the magnet 5 of the float and the magnet 9 of the head portion of the vertical indicating rod, the floating condition is held in air as an integral construction, so that the vertical indicating rod 8 is automatically vertically held by diamagnetic repulsion of the magnet 5 of the flat 4 and the magnet 9 of the head portion of the vertical indicating rod.

Moreover, air is sealed in the space 2A between the float 4 and the head portion 2 in FIG. 4, so that buoyancy of the float 4 becomes large, and even if water is sealed therein, the float 4 can maintain the verticality of the vertical indicating rod 8 by water buoyance and the diamagnetic repulsion of both magnets 5 and 9.

In FIG. 4, 12 is a waterproof receiving antenna base provided by projecting to the upper portion of the float, and 13 is a ground electric wave buffer plate provided on the float correspondingly. Reference numeral 14 is a corner prism reflecting mirror secured at a suitable gravity position of the vertical indicating rod 8.

As described above, when the corner prism reflecting mirror 14 is secured at a suitable position of the vertical indicating rod 8 according to the invention, at the time when the vertical indicating rod as a measuring pole is held vertically, if a reflected light distance original position of the reflecting mirror 14 is made 0 or fixed, even if a beam of light deviated from the light incident direction by 10°–15° viewing a prism by a photometer (not shown) from a long distance is projected, a precise and quick light wave survey to a target (position of the fixed point 6) can be possible.

Moreover, if a projection 4A is provided at the upper portion of the float and a waterproof receiving antenna base 12 is provided, the base 12 can be used as a receiving antenna chip for measuring GPS, and can be used as a measuring pole for GPS (Groval Positioning System) superfine multifunctional measure.

As explained above, the present invention has no fear of water leak apart from the prior float-type vertical indicated unit as simple in maintenance and management, cheap in cost, and precise in measurement.

What is claimed is:

1. A vertical indicator unit for measurement comprising:
   (a) a liquid-filled reverse cup-shaped vessel having a reentrant inner wall enclosing an inner space, said space having an upper and lower portion;
   (b) a float floating in said vessel and having connected to said float a first doughnut-like magnet surrounding at least said lower portion of said inner space of said vessel;
   (c) an external supporting frame secured to the outside of said vessel and having at a lower end a hinge contact point; and
   (d) a vertical indicating rod having a head portion, said head portion being disposed in the inner space of said vessel and having a funnel-like doughnut magnet connected thereto, said funnel-like magnet and said first doughnut-like magnet opposing each other and being oppositely polarized so that said first doughnut-like magnet and said funnel-like magnet are diagmagnetically repulsively held from each other at a certain air space;
   (e) said vertical indicating rod being secured to a lower portion of said head portion, said vertical indicating rod being connected to said hinge contact point on said external supporting frame such that said vertical indicating rod is vertically held with respect to a predetermined position of the lower portion of said external supporting frame by diamagnetism of both magnets and buoyancy of said float.

* * * * *